United States Patent [19]

Silver et al.

[11] Patent Number: 4,547,376

[45] Date of Patent: Oct. 15, 1985

[54] FRUIT CHIP PRODUCT AND PROCESS FOR MAKING SAME

[75] Inventors: Myron E. Silver, Lewisville; Lawrence W. Wisdom, Dallas, both of Tex.

[73] Assignee: Frito-Lay, Inc., Dallas, Tex.

[21] Appl. No.: 556,850

[22] Filed: Dec. 1, 1983

[51] Int. Cl.[4] ............................................. A23L 1/212
[52] U.S. Cl. .................................... 426/102; 426/269; 426/270; 426/310; 426/639; 426/640
[58] Field of Search .............. 426/639, 640, 102, 269, 426/270, 310

[56] References Cited

U.S. PATENT DOCUMENTS

| | | | |
|---|---|---|---|
| 2,004,354 | 6/1935 | Tierney | 426/639 |
| 2,541,859 | 2/1951 | Callaghan et al. | 426/640 |
| 3,365,309 | 1/1968 | Pader et al. | 99/204 |
| 3,384,496 | 5/1968 | Robinson et al. | 426/639 |
| 3,406,078 | 10/1968 | Williams | 426/639 |
| 3,833,747 | 9/1974 | Cordling et al. | 426/289 |
| 3,962,355 | 6/1976 | Yamazaki et al. | 426/639 |

FOREIGN PATENT DOCUMENTS 0003847  1/1977  Japan .................................. 426/639

*Primary Examiner*—Jeanette Hunter
*Attorney, Agent, or Firm*—Bernard, Rothwell & Brown

[57] ABSTRACT

A method for producing dry sweetened, wafer-thin sliced fruit or vegetable products by exposing only one surface of the slices to an aqueous solution containing a carbohydrate, an anti-browning agent, and an acid and drying in monolayers. The acidity of the finished product may be adjusted so that products appealing to sweet-loving palates or tart-loving palates may be easily produced. The aqueous solution may advantageously be sprayed on the upper surface of the sliced fruit or vegetable, rather than by soaking or steeping the slices, so that the slices maintain their structural integrity and the application of the solution is not a rate-limiting factor.

13 Claims, 1 Drawing Figure

FRUIT CHIP PRODUCT AND PROCESS FOR MAKING SAME

BACKGROUND OF THE INVENTION

The present invention relates to thin, crisp sliced fruit or vegetable snacks and a unique method of making them.

A number of methods for drying fruit or vegetable chips have been proposed to provide ready-to-eat snack foods. However, all of the methods proposed for making such sweetened food products to date have involved a soaking or steeping step wherein the freshly cut fruit or vegetable slices must be immersed in a sugar solution for a substantial period of time. While this process results in acceptable food products, such a soaking step has at least four serious drawbacks: because the slices must be soaked for from three minutes to two or more hours, this step severely limits the production rate and increases capital requirements to produce such products in commercial quantities. Secondly, when such chip-type raw materials are placed in a solution for soaking, they inevitably overlie one another so that when they are removed from the immersion tank, there are often two or more layers of slices presented to the drying ovens, resulting in inadequate or uneven drying and therefore unacceptable finished products. Thirdly, by immersing the slices in the sugar solution, the contact surface between the slice and the conveyor belt which moves the slice downstream for further processing is sticky, causing adhesion of the slice to the belt and resulting in difficult removal of the slice from the belt, as well as potentially uneven drying of the slice. Lastly, it has been found that the immersion of fruit or vegetable slices in the sugar solution causes a reduced flavor perception by the consumer, which can be shown analytically in gas-liquid chromatography flavor profiles.

It has been widely known, but for the most part ignored by producers of prepared fruit products, that the consumers of such products may be broadly classified in two distinct categories: those that prefer (consciously or subconsciously) sweet-tasting fruit or vegetable products, and those that likewise prefer tart-tasting fruit or vegetable products.

U.S. Pat. No. 3,365,309, Pader, et al, describes a process wherein prepared unblanched fruit is immersed in an aqueous crystallizing sugar solution for from forty five minutes to twenty two hours and then dried for up to sixteen hours. Another process is described in U.S. Pat. No. 3,962,355, Yamazaki, et al, wherein apple pieces are soaked in a 30–40 percent sugar solution for about fifteen to twenty minutes and subsequently dried. U.S. Pat. No. 3,833,747, Cordling, et al, discloses a process wherein apple segments were soaked in a 40 percent sucrose solution for two hours, and thereafter drained and dried. Numerous other processes have been described for making fruit chips, all of which apparently rely upon relatively long sucrose solution soak times in order to impregnate the fruit slices with sufficient quantities of sweetner to make the desired end product.

However, applicant has found that sliced fruit or vegetable pieces, when immersed in sucrose solution for the amount of time suggested by the processes noted above, became extremely limp and were essentially impossible to work with thereafter. When soaked for the periods of time noted above, the slices lose most of their structural integrity due to a phenomenon known as osmotic dehydration (see, for example, Ponting, et al, *Osmotic Dehydration of Fruits*, Food Technol. Vol. 20 p. 125). Osmotic transfer of the water in the sliced fruit or vegetable from within the cellular structure to the surrounding sucrose solution renders the sliced products an essentially unworkable mass. much in the same way that a paper tissue loses its shape and integrity when immersed in water. Because the food slices become limp, when they are removed from the sucrose solution bath, it is virtually impossible to "monolayer" the slices without expensive monolayering equipment, such as that described in co-pending application, Ser. No. 512,979, filed July 12, 1983, now abandoned, commonly assigned with this application. As a result of this processing defect, Ser. No. 484,488 filed Apr. 13, 1983, now U.S. Pat. No. 4,514,428 (issue fee paid Dec. 28, 1984) commonly assigned, disclosed a process whereby the fruit slices were steeped in a sucrose solution for from three to ten minutes, with approximately five minutes being preferred. While this appeared to be the lower limit of residence time in a sucrose solution bath, such period of time is still a rate-limiting factor for a commercial scale production operation. Additionally, there is still a significant level of osmotic dehydration, with associated difficulties in monolayering, when such a process is used. Therefore, there is a critical need for a process whereby fruit or vegetable chips may be prepared in a commercially feasible process not limited by time, capital, or processing restraints.

SUMMARY OF THE INVENTION

The present invention relates to sliced fruit or vegetable products in the form of sweetened snack foods, and a process for their manufacture. The fruits or vegetables are sliced and monolayered prior to being exposed to an aqueous solution of a carbohydrate, an anti-browning agent, and an acid. The aqueous solution is preferably applied by spraying or dripping for a period of approximately 10–30 seconds. The time required for application of the aqueous solution is determined by that amount of time necessary to cover the exposed surface of the sliced product to the point of overflowing. The excess aqueous solution is removed and the sliced product is dried to a final moisture content of less than 5 percent, and preferably less than 3 percent.

One advantage of the present invention is that osmotic dehydration does not adversely affect the processibility of the fruit or vegetable slices because it does not have an opportunity to occur to any appreciable degree. Because of the relatively rapid application of the aqueous solution to the sliced product, this step is not rate-limiting on a commercial scale.

Another advantage of the invention is that the solids content of the finished product is greater than that from prior art processes, resulting in a more economical end product.

DESCRIPTION OF THE PREFERRED EMBODIMENT(S)

Figure 1:
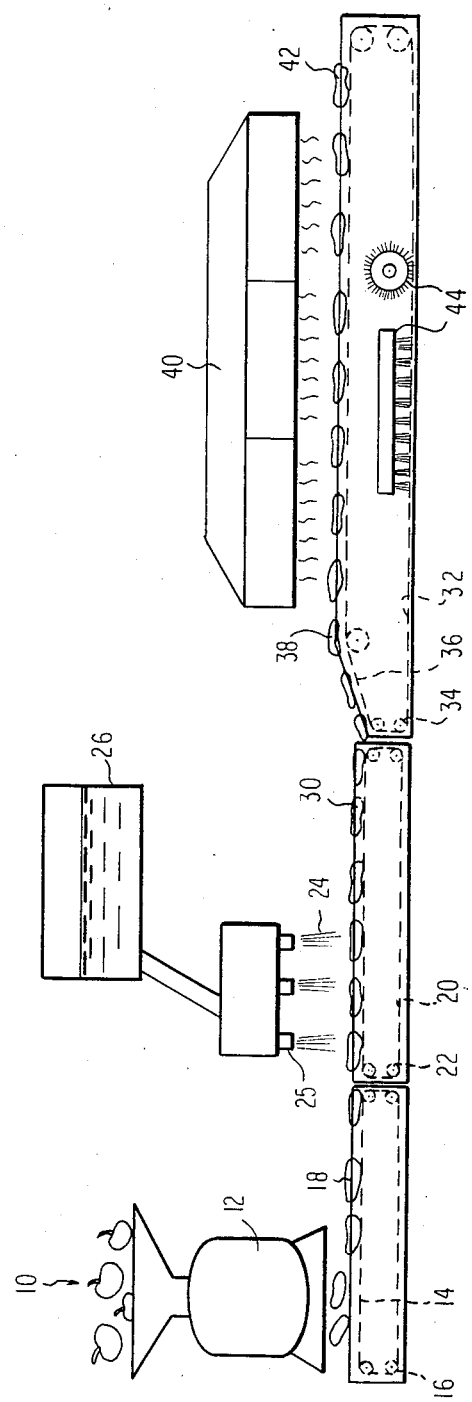
FIG. 1 is a schematic representation of the steps of the process of the present invention.

The present invention provides both a sweetened food product in the form of a fruit or vegetable ready-to-eat snack product, and a process by which said product is made.

The present invention involves the slicing of a fruit or vegetable, indicated generally in FIG. 1 by numeral 10, by any appropriate slicing apparatus 12. Slicing apparatus manufactured by the Urschel Company, and designated by Model #CCL, commonly used by the manufacturers of potato chips to thinly slice potatoes, has been found adequate for this purpose. The fruit or vegetable slices are conveyed by conventional means to and monolayered on a first conveyor belt 14 which is directed about guide rolls 16. Slices are monolayered by placing the slices with the planar surfaces of the slices in substantially the same plane, without substantial overlap of the slices. A particularly useful method of slicing and conveying the slices to the first conveyor belt 14 is disclosed in co-pending application Ser. No. 544,971 filed Oct. 24, 1983.

The monolayered raw slices 18 of fruit or vegetable are directed, by way of example, onto a second conveyor belt 20 which is directed about guide rolls 22. (It is to be understood that, while shown and described herein with three conveyor belts, the present invention can be practiced with a single conveyor belt, or any reasonable number of conveyor belts greater than three.) Slices 18 are subjected to a brief spray, indicated at 24, on one side of the slice, the spray being directed through nozzles 25 on the lower side of reservoir 26. Excess spray will drain through conveyor belt 20 and be returned to reservoir 26 by appropriate means.

The treated slices 30 are then directed onto a third conveyor belt 32 which is directed about rollers 34. A portion 36 of conveyor belt 32 is inclined upwardly so that excess fluids pooled on the surface of chips 30 will drain from the surface of the chips by gravity. Alternatively, an entirely separate conveyor belt may be provided which is inclined upwardly to effect the same result. The drained slices 38 are then directed through a heating zone, such as underneath a radiant or forced air heater 40 to dry the surface fluid from the slices 38 and to reduce the overall moisture content of the slices to the desired level. The heater 40 may comprise a single stage heater or a multi-stage heater with gradually decreasing temperatures. The dried slices 42 are then ready to be packaged in any conventional manner. Conveyor belt 32 can be cleared of residue by means of any conventional cleaning means, such as sprayer and/or brushes 44.

More specifically, it has been found that with most fruits or vegetables sliced as noted hereinabove, extremely short exposure times beneath nozzles 25 are sufficient to provide the raw slices 18 with adequate treating solution to achieve the desired results. The solution in reservoir 26 which is sprayed onto the fruit or vegetable slices comprises a carbohydrate, an anti-browning agent, an acid and water. The carbohydrate is preferably corn syrup solids and sucrose but may be any carbohydrate source which imparts sweetness and the desired texture in the finished product. For example, and by way of illustration only, other carbohydrates which may be utilized include glucose, fructose, lactose, maltodextrins, starches or honey. The carbohydrates can be provided in any proportion up to that quantity which is the upper limit of solubility in the solution, which has been determined herein to be approximately 40 percent on a weight/weight percent basis. Preferably, the carbohydrates are provided in a range of from 30 to 50 percent, and most preferably at approximately 40 percent. The critical factor in the amount of carbohydrate utilized is that amount which gives the particular taste and texture most desired by consumers, i.e., closely resembling the original taste of the freshly sliced fruit or vegetable and having a crispy/crunchy texture.

The acid component of the spray-on solution can be present in an amount sufficient to impart the desired level of tartness or sweetness while secondarily serving as a supplemental anti-browning agent. Examples of the acid component useful herein are any appropriate organic or inorganic acid, including malic, ascorbic, tartaric, lactic, fumaric, succinic, erythorbic or citric acids. Especially preferred is citric acid utilized in an amount of from about 0.1–2.5 weight percent.

While the spray-on solution has been described herein as a single solution, the constituents of the solution may be applied sequentially rather than at the same time. For example, the anti-browning (bisulfite) agent and/or the acid component may be applied to the fruit or vegetable slice before the carbohydrate is applied, as, for instance, in the process of transporting the sliced product from the slicer to the first conveyor belt as shown in copending U.S. Application Ser. No. 544,971, filed Oct. 24, 1983. This modification may speed up the overall process even more than already disclosed, and may potentially reduce the amount of residual bisulfite in the finished product.

It has been found that large segments of the consuming public heavily favor either a "sweet" or a "tart" taste in such products as apples, and may in fact repurchase only if the product is consistently available in either the "sweet" or the "tart" flavors. Therefore, it is possible to have available for consumers the same product in different taste categories, with the different tastes being a result of the levels of the acid component utilized. For example, it has been found that "sweet-loving palates" prefer processed apple slices made from a solution of the present invention having a citric acid content of from about 0.6–0.75 weight percent, and "tart-loving palates" prefer apple slices made from such solution having from about 1.3–1.5 weight percent citric acid. The attribute may be quantified by use of a titratable acidity test wherein for a "sweet" product the titratable acidity is held to a level of less than 14, while for a "tart" product the titratable acidity is greater than 14. This test is performed by obtaining 5 gm samples of dried finished product and blending the sample for 5 minutes with 45 ml of deionized water. This product is titrated to a pH of 8.1–8.2 with 0.1N sodium hydroxide, and a buret reading is recorded. The "titratable acidity" is the quantity (in mls) of the 0.1 N sodium hydroxide per 5 gm sample necessary to produce a pH of 8.1–8.2.

The anti-browning agent utilized in the spray solution includes both sulfiting and nonsulfiting agents, such as potassium bisulfite, sodium and potassium metabisulfite, organic and inorganic acids including citric, malic, ascorbic, tartaric, erythobic, and lactic acids. With respect to the inorganic acids, the pH should be adjusting since polyphenol oxidase which is associated with browning is pH dependent. Other anti-browning procedures known in the art may be utilized as alternatives. It has been found that sodium metabisulfite in a range of from 0.02–1.0 weight percent, and especially at a 0.1 weight percent level, functions adequately to prevent browning while at the same time not adding sufficient sulfite to cause an adverse reaction among sulfite-sensitive consumers.

The fourth component, which as noted above is preferably water, may be any suitable solvent for these compounds which does not impart adverse flavors or texture properties to the end product.

As noted above, all known prior art processing techniques to produce end products similar to those of the present invention, utilize relatively long periods of immersion of the sliced product in the treating solution. It has been found that a period even as short as three minutes creates a fruit or vegetable slice having extremely difficult handling properties as a result of osmotic dehydration, as well as reduced flavor perception. However, we have discovered that applying the treating solution described above to only one side of the fruit or vegetable slice, as by spraying or dripping, for as short a period as 10–30 seconds produces superior end products. The handling characteristics of the slices are not adversely affected, while sufficient treating solution is applied to achieve the desired end product taste. It has been found that by spraying or soaking fruit or vegetable slices for as short a period as one minute tends to leach out flavors due to osmotic dehydration. Therefore, the slices of the present invention are sprayed for as short a period as possible, the minimum time period being that amount of time under the spray which is necessary to cover the upper surface of the slice to the point of overflowing. However, once the surface is filled to overflowing, there will generally be excess solution which can be removed either by tilting the chip and having the excess solution drain off by gravity or by removing the excess solution mechanically, as by use of an air knife. While it does not appear to be critical, improved tasting products are achieved if the solution is permitted to remain on the surface of the chip for at least one to two minutes, but less than five minutes, in order to permit some penetration of the solution into the cellular structure of the chip.

The resulting solids content of snack items such as the chips produced by the method of the present invention is often a critical element of the viability of such products from an economic standpoint. Because of the relatively high cost of the raw materials (e.g., apples, oranges, bananas, pineapples, etc.) maximizing the solids content of the finished product is important. For example, using a process such as that disclosed in co-pending application Ser. No. 484,488, a yield of approximately 20 percent can be achieved with as short a steeping period as three minutes (e.g., 20 pounds of dried product may be obtained from 100 pounds of fresh apples). However, yields of 25 percent or more may be obtain by practicing the present invention. While it is not known precisely why this effect is observed, it is hypothesized that osmotic loss of solids in a steeping or soaking procedure is much greater than the osmotic loss of solids in the present invention, due to the fact that the surface area exposed (and the time of exposure) when the entire slice is immersed is much greater, thereby permitting greater cellular loss of solids.

The temperature of the solution sprayed onto the slices is preferably at ambient temperature rather than at an elevated temperature as practiced in many of the prior art processes. Fruit or vegetable slices subjected to elevated temperatures, whether during the spray application of solution of the present invention or when immersed according to the prior art, lose a portion of their structural integrity and are difficult to handle in a commercial high speed operation.

Drying of the treated slices may be accomplished in any conventional manner. The moisture content of the finished product should be less than 5 percent, and preferably less than 3 percent.

It has been found by gas-liquid chromatographic analysis of the products of the present invention, when compared with such analysis of a fresh apple slice or slices of representative prior art processes wherein the slices are immersed for from five minutes to two hours, that the flavor profile of the products of the present invention more closely resembles the flavor profile of a fresh apple slice than does the flavor profile of prior art processes. It is believed that the immersion of the fruit or vegetable slices in the sugar solution in effect "leaches" important flavor constituents from the slices.

In order to illustrate further the nature of this invention and the manner of practicing the invention more fully, the following examples are presented.

EXAMPLE 1

Whole apples were washed, sliced to about 0.06 inches thickness, monolayered on a porous conveyor, sprayed for about 30 seconds with an aqueous solution at ambient temperature comprising 30% corn syrup solids, 10% sugar, 0.75% citric acid (to make a sweeter product) or 1.50% citric acid (to make a tarter product) and 0.1% sodium metabisulfite. The slices were drained briefly by gravity to remove excess surface liquid and dried in a multi-zone drier at temperatures of from 240° F. to 350° F. with a residence time of about 15 minutes. Upon completion of the drying, the slices were cooled, whereupon they became rigid and crisp, and packaged to prevent reabsorption of moisture. Final product yield was approximately 25%. Analysis indicated a moisture content of less than 3%, titratable acidity of about 10 for the sweeter product and about 16 for the tarter product. Residual $SO_2$ levels were under 100 ppm. When tested with consumers, this product scored 7.3 (highly acceptable) in an Organizational Multi-test hedonic rating scale of 1-9.

EXAMPLE 2

Whole pears (Bartlett variety) were washed and sliced to about 0.04 inches thickness, monolayered on a conveyor, spraying for about 30 seconds with an aqueous solution containing 31% (w/w) corn syrup solids, 3% sugar, 0.6% citric acid and 0.1% sodium metabisulfite. The slices were drained briefly by gravity and dried in a multi-zone drier at a temperature of from 240°–350° F. for about 10 minutes. Product yield was approximately 22%, final moisture 2.8%, and titratable acidity 7. In a consumer panel, the product scored 6.0 (acceptable) on a 1-9 hedonic scale.

Since many modifications, variations and changes in detail may be made to the embodiments described above, it is intended that all manner in the foregoing description and shown in the accompanying drawing will be interpreted as illustrative only, and not in a limiting sense. The invention is to be broadly construed and should be limited only by the character of the claims appended hereto.

I claim:

1. A method for continuously and economically producing crisp and dry fruit or vegetable slices comprising the steps of:
    (a) slicing whole fruit or vegetable pieces into thin, wafer-like slices;
    (b) monolayering the slices with the planar surfaces of the slices in substantially the same plane and without substantial overlap of the slices;

(c) rapidly applying to the monolayered slices an aqueous film comprising a carbohydrate in aqueous solution, an anti-browning agent in aqueous solution and an acid in aqueous solution to substantially cover at least one surface of the monolayered slices with the aqueous film, wherein the titratable acidity of the slices is adjusted to alter the tartness of the slices; and (d) rapidly drying the slices, while the slices are monolayered for at least a portion of the drying, the drying being continued to produce dried crisp slices.

2. The method of claim 1 wherein the aqueous film is applied to the monolayered slices by spraying or dripping aqueous solution onto only the upper surface of the monolayered slices.

3. The method of claim 1 or 2 wherein said carbohydrate is present in aqueous solution at a concentration of from about 30% to about 50% by weight, said anti-browning agent is present in aqueous solution at a concentration of from about 0.02% to about 1.0% by weight, and said acid is present in aqueous solution at a concentration of from about 0.1% to about 2.5% by weight.

4. The method of claim 3 wherein said carbohydrate comprises sucrose, corn syrup solids, dextrose, or any other suitable food grade carbohydrate, or combinations thereof; said anti-browning agent comprises potassium bisulfite, sodium or potassium sulfite, sodium or potassium metabisulfite, erythorbic acid, or organic or inorganic acids or their salts, or combinations thereof; and said acid comprises citric acid, malic acid, ascorbic acid or any other suitable organic acid or any other suitable acid, or combination thereof.

5. The method of claim 4 wherein said carbohydrate is corn syrup solids and sucrose, and said carbohydrate is an aqueous solution at a concentration of about 40% by weight; said anti-browning agent is sodium metabisulfite, and said anti-browning agent is an aqueous solution at a concentration of about 0.1% by weight; and said acid is citric acid, and said acid is an aqueous solution at a concentration of from about 0.6% to about 1.5% by weight.

6. The method of claim 1 or 2 wherein the titratable acidity is adjusted to less than about 14 mls of 0.1N sodium hydroxide per 5 gm of dried slices necessary to produce a pH of 8.1–8.2.

7. The method of claim 1 or 2 wherein the titratable acidity is adjusted to greater than about 14 mls of 0.1N sodium hydroxide per 5 gm of dried slices necessary to produce a pH of 8.1–8.2.

8. The method of claim 1 or 2 wherein the aqueous film is applied to the slices in a period of time of less than about 1 minute.

9. The method of claim 1 or 2 wherein the aqueous film is applied to the slices to cover the slices to the point of overflowing.

10. The method of claim 1 or wherein the slices are dried to a moisture content of less than about 5% by weight.

11. The method of claim 1 or 2 wherein the slices are dried to a moisture content of less than about 3% by weight.

12. A food product prepared by the method of claim 1.

13. A food product prepared by the method of claim 2.

* * * * *

UNITED STATES PATENT AND TRADEMARK OFFICE
Certificate

Patent No. 4,547,376                                              Patented: October 15, 1985

On petition requesting issuance of a certificate for correction of inventorship pursuant to 35 U.S.C. 256, it has been found that the above-identified patent, through error and without any deceptive intent, improperly sets forth the inventorship. Accordingly, it is hereby certified that the correct inventorship of this patent is:
Myron E. Silver, Lawrence W. Wisdom, O. George Dowdie and Janice L. Ruegg.

Signed and Sealed this 14th Day of August 1990.

DONALD E. CZAJA

*Supervisory Patent Examiner*
                                                                                      *Art Unit 132*